United States Patent [19]

Haren

[11] 4,130,139
[45] Dec. 19, 1978

[54] FLEXIBLE HOSE CONSTRUCTION AND METHOD OF MAKING SAME

[75] Inventor: Doyle V. Haren, Clyde, N.C.

[73] Assignee: Dayco Corporation, Dayton, Ohio

[21] Appl. No.: 815,615

[22] Filed: Jul. 13, 1977

[51] Int. Cl.² .............................................. F16L 11/08
[52] U.S. Cl. ..................................... 138/125; 138/137; 138/141; 156/149; 138/DIG. 1
[58] Field of Search ............... 138/125, 126, 137, 141, 138/DIG. 1; 156/149, 327, 331

[56] References Cited

U.S. PATENT DOCUMENTS

| | | | |
|---|---|---|---|
| 3,049,762 | 8/1962 | Jackson | 156/149 |
| 3,159,183 | 12/1964 | Brumbach | 138/125 |
| 3,310,447 | 3/1967 | Matthews | 138/DIG. 1 |
| 3,332,447 | 7/1967 | Holmgren | 138/DIG. 1 |
| 3,334,165 | 8/1967 | Koch | 138/125 X |
| 3,383,258 | 5/1968 | Houlston | 138/DIG. 1 |
| 3,506,515 | 4/1970 | Robinson et al. | 138/125 X |
| 3,725,501 | 4/1973 | Hilbelink et al. | 156/327 X |
| 3,883,384 | 5/1975 | Hopkins | 138/126 X |
| 4,007,070 | 2/1977 | Buscheiker | 138/123 X |

Primary Examiner—Charles E. Phillips
Assistant Examiner—James E. Bryant, III
Attorney, Agent, or Firm—Reuben Wolk

[57] ABSTRACT

A flexible hose construction and method of making same are provided wherein such hose construction comprises a flexible nylon-11 base tube, a braided reinforcing layer disposed around the base tube, and a layer of adhesive means between the base tube and reinforcing layer consisting of a mixture of a urethane prepolymer and a cross-linking material (4,4'methylene-bis-chloroaniline) defining the sole means bonding the braided reinforcing layer to the base tube.

8 Claims, 4 Drawing Figures

FLEXIBLE HOSE CONSTRUCTION AND METHOD OF MAKING SAME

BACKGROUND OF THE INVENTION

Nylon-11 is widely used for industrial and automotive flexible hose applications because it has very low moisture absorption and can be readily plasticized. However, in many flexible hose applications a nylon-11 base tube is employed which requires reinforcement therearound and such reinforcement is usually in the form of braided reinforcing layers disposed around such base tube.

However, it is very difficult to adhere nylon-11 to itself or to other materials used to make the braided reinforcing layers, for example, without special heat or chemical treatment of adjoining surfaces. One treatment which has been used in the past is use of a heated resorcinol water solution which serves to plasticize the nylon-11 to allow adherence of a braided reinforcing layer thereagainst. Another treatment which has been used is to use a special solvent on the nylon-11 together with a special adhesive.

However, any special treatment of the nylon-11 base tube or of material used in defining a braided reinforcing layer around such base tube results in increasing the overall cost of the hose construction.

SUMMARY

It is a feature of this invention to provide a flexible hose construction comprised of a flexible nylon-11 base tube which has a braided reinforcing layer disposed and tenaciously bonded against the base tube with the braided layer being held to the nylon-11 base tube by a simple adhesive layer of ambient air dried or ambient air cured adhesive means.

Another feature of this invention is to provide a hose construction of the character mentioned in which the layer of air cured adhesive means is applied on the nylon-11 base tube with such base tube and adjoining braided reinforcing layer being free of or without special treatment such as heat treatment, solvent treatment, chemical treatment, combinations of such treatments, or the like.

Another feature of this invention is to provide a flexible hose construction of the character mentioned wherein the layer of ambient air cured adhesive means between the base tube and reinforcing layer consists of a mixture of a urethane prepolymer and a cross-linking material.

Another feature of this invention is to provide an improved method of making a hose construction of the character mentioned.

Another feature of this invention is to provide an improved method of making a reinforced flexible hose construction of the character mentioned wherein a nylon-11 base tube is provided and a mixture of urethane prepolymer and cross-linking material suitably prepared whereupon the mixture is applied as a layer of adhesive means on the base tube with the applying step being achieved while keeping the base tube free of special treatment. A reinforcing layer made of a synthetic plastic material is then braided against the layer of adhesive means with the reinforcing layer and synthetic plastic material being free of special treatment followed by ambient air curing of the layer of adhesive means to provide a tenacious bond between the reinforcing layer and the tube.

Another feature of this invention is to provide an improved method of making a hose construction of the character mentioned in which between 2 to 1 and 10 to 1 parts urethane prepolymer and cross-linking material respectively are mixed to define a mixture which is applied to define the layer of adhesive means.

Accordingly, it is an object of this invention to provide a hose construction and method of making same having one or more of the novel features set forth above or hereinafter shown or described.

Other details, features, objects, uses, and advantages of this invention will become apparent from the embodiments thereof presented in the following specification, claims, and drawing.

BRIEF DESCRIPTION OF THE DRAWING

The accompanying drawing shows a present preferred embodiment of this invention, in which.

DETAILED DESCRIPTION

Figure 1:
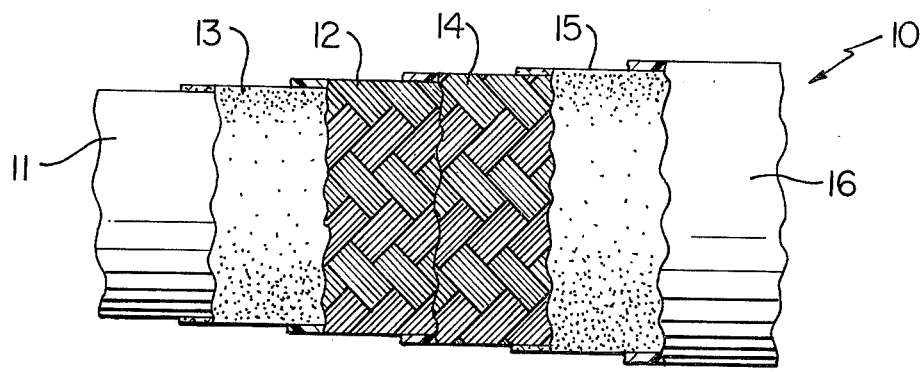
FIG. 1 is a view with parts in elevation, parts in cross-section, and parts broken away illustrating one exemplary embodiment of the hose construction of this invention.

Reference is now made to FIG. 1 of the drawing which illustrates an exemplary hose construction of this invention which is designated generally by the reference numeral 10. The hose construction 10 is capable of conveying fluids, including both liquids and gases, under pressure with minimum moisture absorption due to its having a base tube 11 made of flexible nylon-11.

The hose construction 10 has a braided reinforcing layer 12 disposed around the base tube 11 and a layer of adhesive means 13 between the base tube 11 and braided reinforcing layer 12. The layer of adhesive means 13 provides a high strength tenacious bond between the base tube 11 and braided reinforcing layer 13 by simple adhesion or adhesive action between the layers 11-12 without any special treatment of either of these layers including without special heat treatment or without special chemical treatment, for example. The layer 13 of adhesive means consists of a mixture of urethane prepolymer and a cross-linking material and such mixture will be described in more detail subsequently.

The exemplary hose construction 10 also has an outer braided reinforcing layer 14 which in this example is disposed and braided against the layer 12; and, the hose construction 10 has an adhesive 15, which may be made of any suitable adhesive material known in the art, disposed against the outside surface of the outer braided layer 14 and for the purpose of bonding an outer cover sleeve 16 against the outer braided layer 14. The cover sleeve 16 protects the overall hose construction 10 against damage of all types including both chemical and mechanical damage.

The base tube 11 is made of a flexible nylon-11 (11-aminoundecanoic acid) material and it is well known in the art that it is very difficult to adhere other materials, such as synthetic plastic materials of the types usually comprising the braided layer 12, against the nylon base tube 11 made of nylon-11. However, in accordance with the teachings of this invention the method employed in making the hose construction 10 is both simple and economical.

Figure 2:
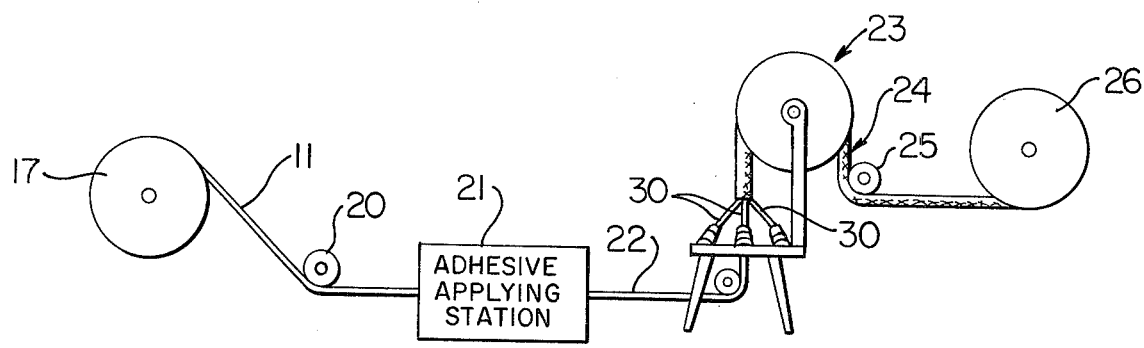
FIG. 2 is a schematic presentation illustrating method steps of providing a base tube of nylon-11 in roll form, applying a layer of adhesive means against the base tube in a continuous process, braiding a reinforcing layer against the base tube, and then coiling the resulting construction to define a roll thereof which is air dried in ambient air prior to final processing.

In particular, the base tube 11 is provided for unwinding rotation on a supply roll 17 thereof (FIG. 2), passed around a turn roll 20, and moved into an adhesive applying station 21 where a layer of adhesive means 13 is applied thereagainst while maintaining the base tube 11 in continuous motion to define what may be considered an adhesivecoated base tube 22. The adhesive coated base tube is then passed through a braider 23 which is shown schematically and may be of any suitable known conventional construction where the reinforcing layer 13 is braided around the base tube 11 and against the adhesive layer 13 to define a braided tube construction 24. The braided base tube construction 24 is then passed around a turn roll 25 and wound to define a supply roll 26 thereof.

The supply roll 26 consisting of the base tube 11, adjoining layer of adhesive means 13, and braided layer 14 adjoining the adhesive means 13 is then allowed to air dry or air cure at ambient temperature and pressure for a predetermined time period. This ambient air curing results in the layer of adhesive means 13 providing a tenacious bond between the base tube 11 made of nylon-11 material and the braided layer 12 in a manner heretofore unknown. Further, it will be appreciated that neither the base tube 11 nor the individual filaments 30 being braided against the adhesive layer 13 by the braider 13 to define reinforcing layer 12 has been provided with any special treatment, either heat or chemical treatment.

The length of time required to ambient air cure the layer 13 is generally of the order of several hours; and, good results have been obtained when air curing has been achieved for a time period of approximately 24 hours or generally of the order of one day.

Figure 4:
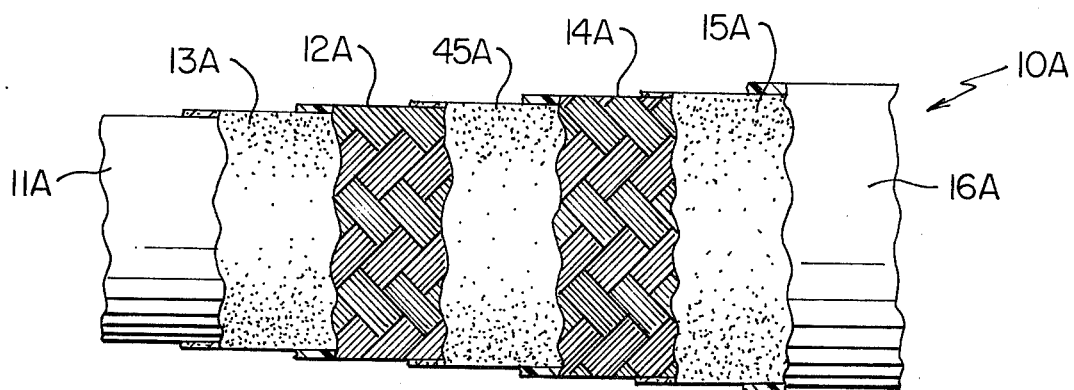
FIG. 4 is a view similar to FIG. 1 illustrating another exemplary embodiment of the hose construction of this invention which may be made utilizing method steps similar to the method steps disclosed in FIGS. 2 and 3.

The braided base tube or hose construction comprised of a nylon base tube 11 with the ambient air cured adhesive layer 13 bonding the braided reinforcing layer 12 thereagainst is also designated by the reference numeral 24 and may then be further processed to define the hose construction 10 of FIG. 1. Accordingly, the hose construction 24 is passed through a second braider 33 having filaments 34 which as seen in FIG. 4, are braided in position against the braided layer 12 to define the braided layer 14 and a resulting hose construction 35 which is then passed around a turn roll 36 toward a second adhesive application station 37 where the adhesive layer 15 is applied. The layer 15 is then either partially or fully cured at a curing station 40 and the hose construction continued to a sleeve application station 41 where a cover sleeve is suitably applied thereagainst and bonded in position by the adhesive layer 15. The resulting construction is then cooled at cooling station 42 to define the completed hose construction 10 which is wound in roll or coil form to define a supply roll 43 thereof.

The sleeve adhesive 15 applied at the sleeve adhesive application station 37 may be any suitable adhesive known in the art for the purpose of fixing or bonding a cover sleeve such as sleeve 16 against a hose construction of this type. However, the adhesive layer 13 provided at the adhesive application station 21 is unique in that the bonding of the base tube 11 made of nylon-11 material to the braided layer 12 may be achieved in a continuous process without special treatment of either the outside surface of the base tube or the inside surface of the braided layer 12 and as mentioned earlier.

The layer of adhesive means 13 consists of a mixture of a urethane prepolymer and a cross-linking material, as previously mentioned, and the cross-linking material is preferably in the form of 4, 4' methylene-bis-chloroanaline. The layer of adhesive is made by mixing the urethane prepolymer and cross-linking material in a mixture comprising between 2 to 1 and 10 to 1 parts by weight of urethane prepolymer and cross-linking material respectively and preferably the mixture comprises generally of the order of 6 to 1 parts by weight of urethane prepolymer and cross-linking material respectively.

Although any suitable urethane prepolymer may be employed to define the adhesive layer 13, excellent results have been obtained by utilizing a urethane prepolymer made by Uniroyal Chemical, Division of Uniroyal Incorporated, EMIC Building, Naugatuck, Conn. 06779 and sold under the registered trademark of "Vibrathane".

Similarly, although any suitable cross-linking material may be used, the 4, 4' methylene-bis-chloroaniline is preferred. However, excellent results have also been obtained by employing an organo-tin cross-linking material sold by Anderson Development Company, 1415 East Michigan Street, Adrian, Michigan, 49221 and sold under the registered trademark "Curene".

As indicated earlier, the air curing of the adhesive layer is achieved at ambient air temperature and pressures. Similarly, both the mixing and applications of the urethane prepolymer and cross-linking material are also achieved at ambient air temperature and pressure and free of or without heat an any stage.

The adhesive layer 13 may be applied by dipping the base tube 11 in a tank containing a premixed mixture of the urethane prepolymer and cross-linking material and wiping away any excess utilizing a suitable wiping mechanism such as a wiping die; however, it will be appreciated that the layer 13 may be applied on the base tube by any suitable process including spraying, brush coating, roller coating. In addition, instead of premixing the urethane prepolymer and cross-linking material and then applying same as a layer 13, the mixing may be achieved by a suitable metering device and immediately upon metering mixture, application of the adhesive layer 13 is achieved in the device itself.

Figure 3:
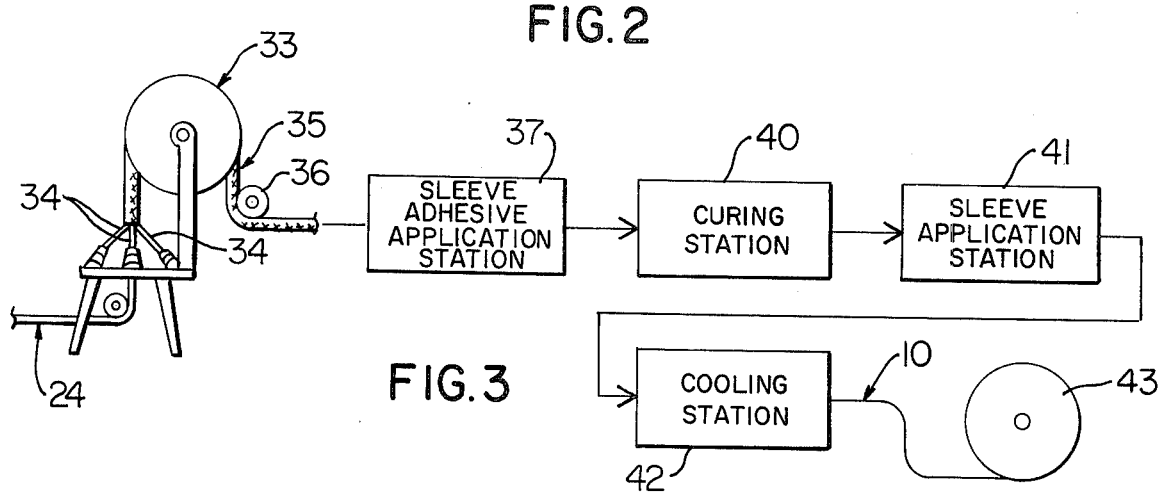
FIG. 3 is a schematic presentation illustrating the nylon-11 base tube with a single braided layer adhesively bonded thereagainst being further processed to define the hose construction of FIG. 1.

The method of this invention enables the application of the adhesive layer 13 and the braiding of layer 12 in a continuous uninterrupted process to define the intermediate hose construction 24 which is wound on supply roll 26 and then air cured using ambient air. The hose construction 24 provided in roll form on the roll 26 may then be further processed in a continuous process as shown in FIG. 3 to define the completed hose construction 10 as explained earlier. It will also be appreciated that the hose construction 24 or braided base tube 24 after ambient air curing may be used as an end product or hose construction in some application of the invention.

Another exemplary embodiment of the hose construction of this invention is illustrated in FIG. 4 of the drawing. The hose construction of FIG. 4 is very similar to the hose construction 10; therefore, such construction will be designated by the reference numeral 10A and component parts of the hose construction 10A which are similar to corresponding parts of the hose construction 10 will be designated in the drawing by the same reference numeral as in the hose construction 10 (whether or not such component parts are described in detail in the specification) followed by the letter designation A and not described again in detail. Only those component parts of the hose construction 10A which are different from corresponding parts of the hose construction 10 will be designated by a new reference numeral also followed by the letter designation A and described in detail.

The hose construction 10A has an inner base tube 11A made of nylon-11 material, an adhesive layer 13A for inner braided layer 12A, an outer braided layer 14A, and adhesive 15A for the cover sleeve 16A. However, it will be seen that the hose construction 10A has an adhesive layer 45A between the braided layers 12A and 14A. The adhesive layer 13A and the adhesive layer 45A are each made of a mixture of urethane prepolymer and cross-linking material as previously described for the layer 13 and in the same ratios. The adhesive layer 45A provides a tenacious bond between the braided layers 12A and 14A regardless of the materials employed to made such braided layers.

The braided reinforcing layers 12, 14, 12A and 14A may be made employing suitable synthetic plastic materials as used in the art for this purpose and including nylon, polyester, and aramid, for example. Similarly, the outer protective sleeve 16 and 16A for the hose construction 10 and 10A respectively may be made of any suitable synthetic plastic material such as urethane, polyester, and vinyl. In many applications it is preferred that the outer cover sleeve 16 or 16A be made of a softer and more flexible material than the base tube.

However, regardless of the materials employed to define the various braided reinforcing layers, this invention makes possible (in a manner heretofore unknown) the bonding of a braided reinforcing layer to the outside surface of a base tube made of nylon-11 material without special treatment of such base tube and without special treatment of the adjoining braided reinforcing layer.

While present exemplary embodiments of this invention, and methods of practicing the same, have been illustrated and described, it will be recognized that this invention may be otherwise variously embodied and practiced within the scope of the following claims.

What is claimed is:

1. A flexible hose construction comprising a flexible nylon-11 base tube, a braided reinforcing layer disposed around said base tube, and a layer of adhesive means between said base tube and reinforcing layer consisting of a mixture of a urethane prepolymer and a cross-linking material, said cross-linking material comprising 4, 4' methylene-bis-chloroaniline, said layer of adhesive means being a solely ambient air cured adhesive means and comprising the sole means bonding said braided reinforcing layer and said base tube yet providing a tenacious bond therebetween.

2. A hose construction as set forth in claim 1 in which said mixture comprises between 2 to 1 and 10 to 1 parts by weight of urethane prepolymer and cross-linking material respectively.

3. A hose construction as set forth in claim 1 in which said mixture comprises generally of the order of 6 to 1 parts by weight of urethane prepolymer and cross-linking material respectively.

4. A hose construction as set forth in claim 2 in which said braided reinforcing layer is made of a synthetic plastic material.

5. A hose construction as set forth in claim 4 and further comprising another braided reinforcing layer disposed around said first-named braided layer, said other braided layer also being made of a synthetic plastic material.

6. A hose construction as set forth in claim 5 and further comprising another layer of adhesive means between said braided layers, said other layer of adhesive means also consisting of a mixture of urethane prepolymer and a cross-linking material, said mixture of said other layer of adhesive means also comprising between 2 to 1 and 10 to 1 parts by weight of urethane prepolymer and cross-linking material respectively, said cross-linking material of said other layer of adhesive means comprising 4, 4' methylene-bis-chloroaniline, said other layer of adhesive means also being a solely ambient air cured adhesive means and comprising the sole means bonding said braided layers and also providing a tenacious bond therebetween.

7. A hose construction as set forth in claim 5 and further comprising an outer protective sleeve disposed around said braided reinforcing layers.

8. A hose construction as set forth in claim 5 in which said other braided reinforcing layer is disposed against said first-named braided reinforcing layer free of adhesive means between braided layers and further comprising a cover sleeve for said hose construction disposed around said braided layers.

* * * * *